Jan. 15, 1963   J. W. REED ETAL   3,073,017
RAILROAD WHEEL AND AXLE ASSEMBLY HANDLING MACHINE
Filed Oct. 24, 1958   6 Sheets-Sheet 1

INVENTORS
JOHN W. REED
HENRY J. HALVORSEN
BY
Kenyon & Kenyon
ATTORNEYS

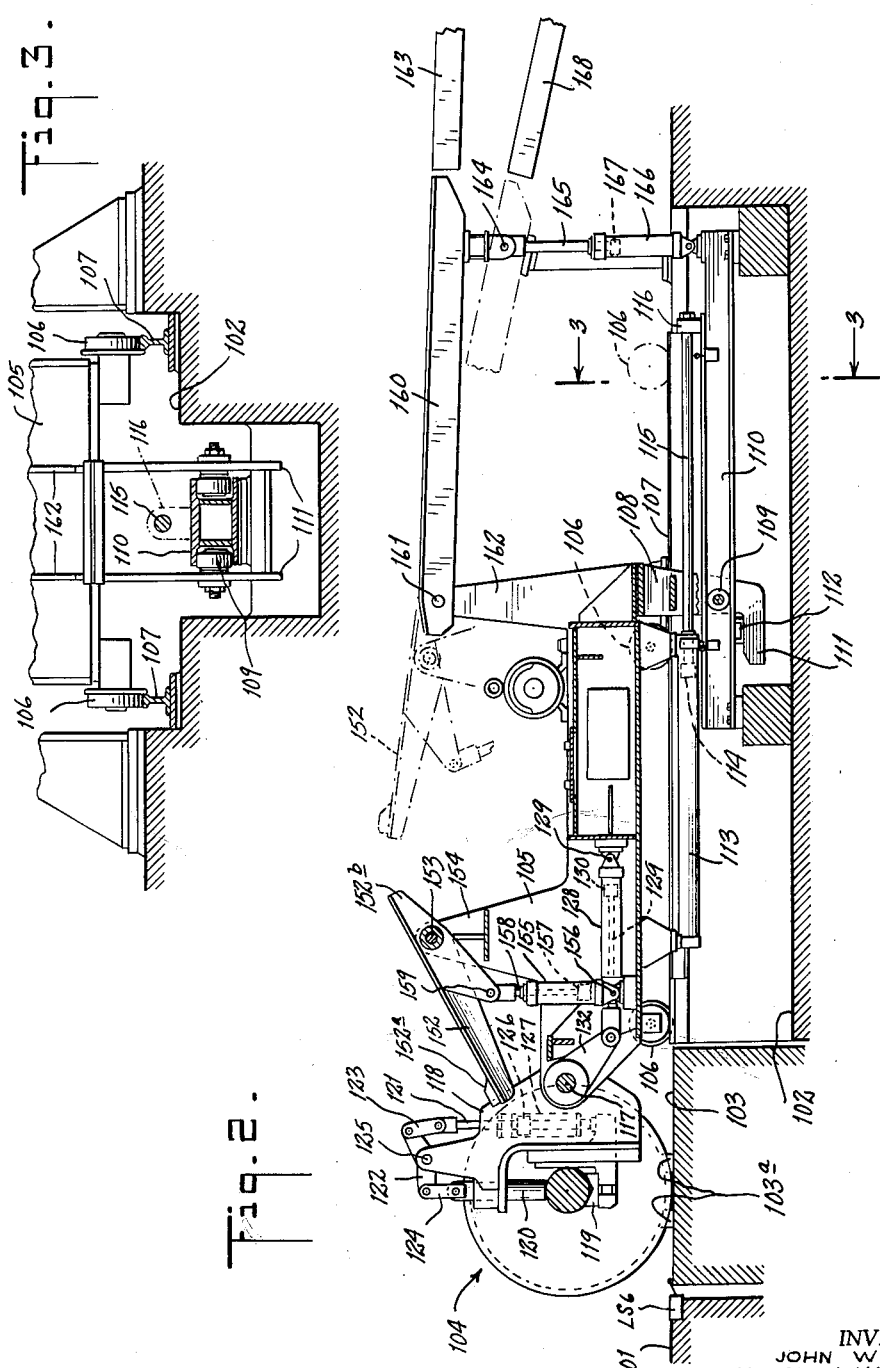

Jan. 15, 1963 J. W. REED ETAL 3,073,017
RAILROAD WHEEL AND AXLE ASSEMBLY HANDLING MACHINE
Filed Oct. 24, 1958 6 Sheets-Sheet 3
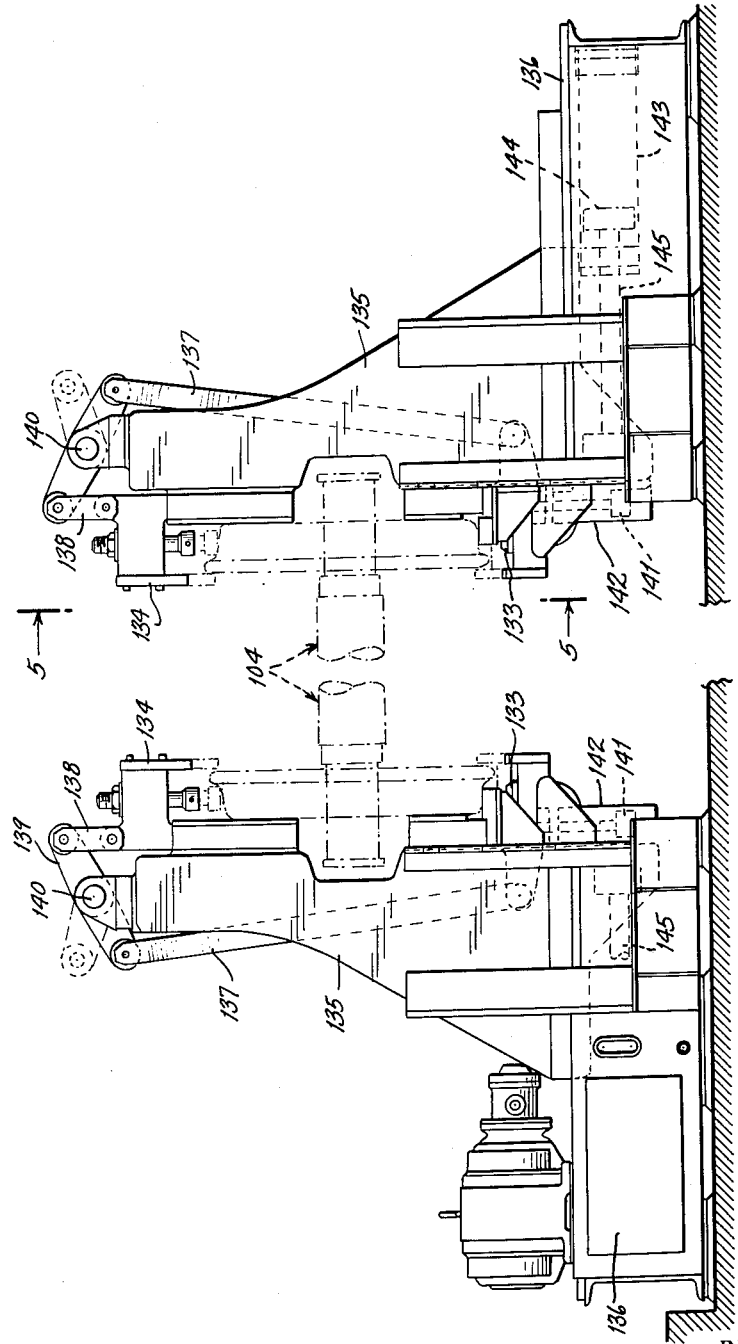
INVENTOR.
JOHN W. REED
HENRY J. HALVORSEN
BY
ATTORNEYS Jan. 15, 1963 J. W. REED ETAL 3,073,017
RAILROAD WHEEL AND AXLE ASSEMBLY HANDLING MACHINE
Filed Oct. 24, 1958 6 Sheets-Sheet 4
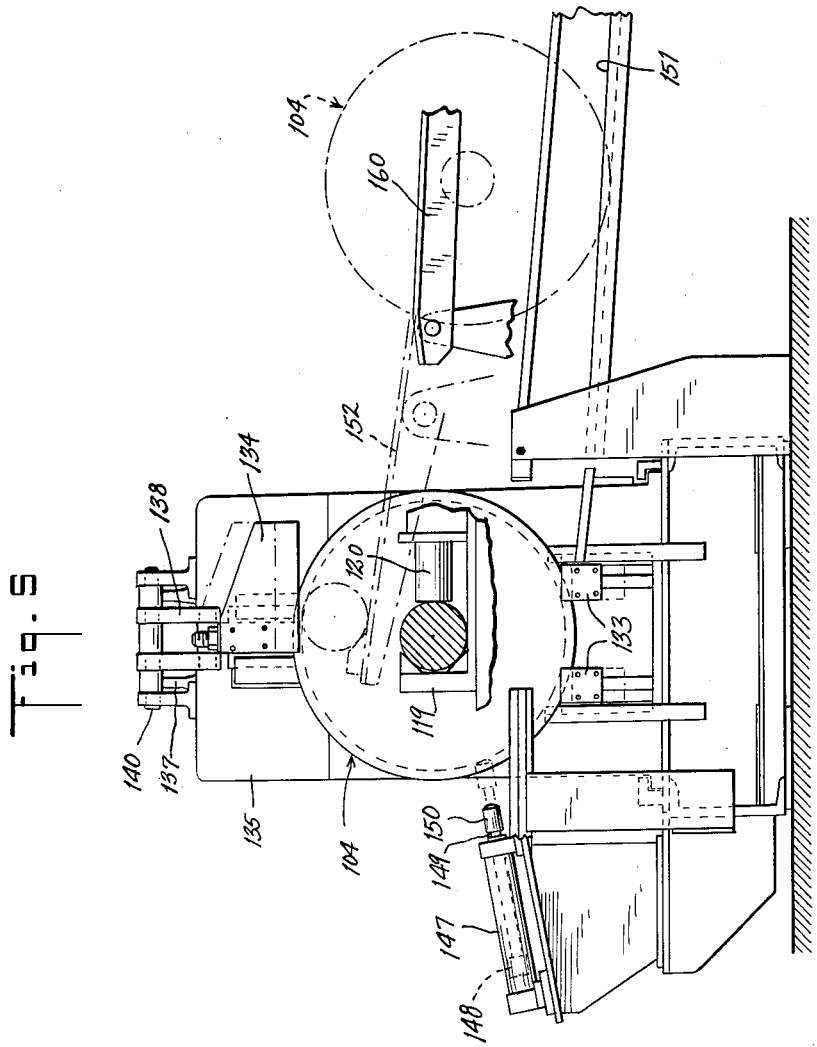
INVENTOR.
JOHN W. REED
HENRY J. HALVORSEN
BY
Kenyon & Kenyon
ATTORNEYS Jan. 15, 1963 J. W. REED ETAL 3,073,017
RAILROAD WHEEL AND AXLE ASSEMBLY HANDLING MACHINE
Filed Oct. 24, 1958 6 Sheets-Sheet 5

Fig. 6.

INVENTORS
JOHN W. REED
HENRY J. HALVORSEN
BY
*Kenyon & Kenyon*
ATTORNEYS

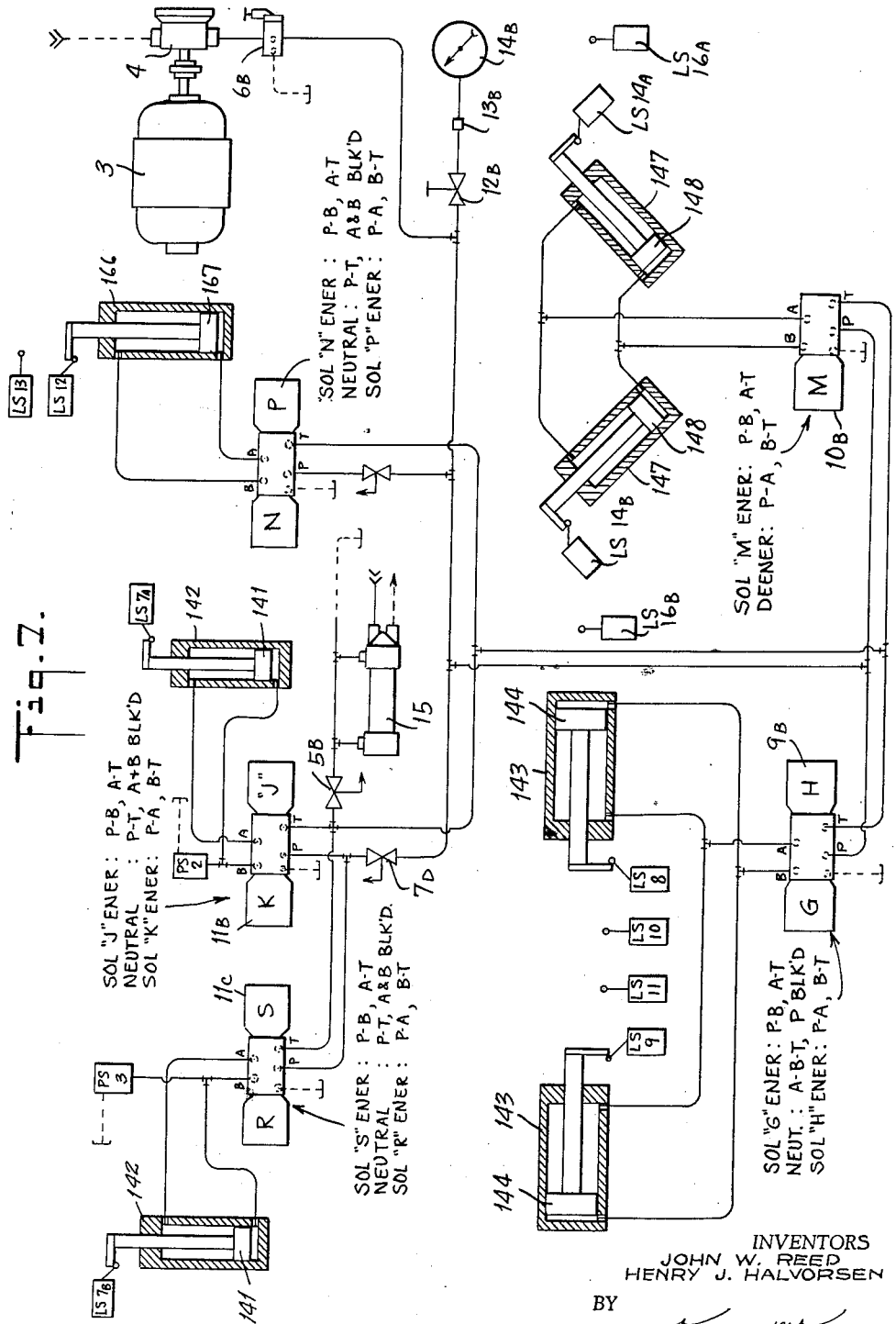

United States Patent Office 3,073,017
Patented Jan. 15, 1963

3,073,017
RAILROAD WHEEL AND AXLE ASSEMBLY
HANDLING MACHINE
John W. Reed, Elizabeth, and Henry J. Halvorsen, Cranford, N.J., assignors to Farrel-Birmingham Company, Inc., Ansonia, Conn., a corporation of Connecticut
Filed Oct. 24, 1958, Ser. No. 769,504
6 Claims. (Cl. 29—252)

This invention relates to a railroad wheel and axle assembly handling machine.

When railroad wheel and axle assemblies have been in service the wheels ultimately wear and must be replaced. These wheels and axles are in the form of assemblies each comprising an axle having wheel seats on which the wheels are press fitted. Therefore, it is necessary to send the assemblies to a demounting press which forcibly removes the wheels from the wheel seats and leaves them loosely on the axle's end portions, the latter having the usual end flanges which prevents the wheels from literally falling off of the axle.

Such a loose wheel and axle assembly in the demounting press presents a handling problem. The wheels cannot be simply pulled from the ends of the axle because of the latter's end flanges which require the wheels to be oriented coaxially with the axle so that the wheel hubs can clear these axle end flanges. The parts are, of course, very heavy and awkward to handle.

With the foregoing in mind one of the objects of the present invention is to provide automated equipment in the form of a machine which can reach into the railroad wheel demounting press, remove the wheel and axle assembly and disassemble the latter, and send the wheels and axle rolling away free from each other. Another object is to provide a machine of this character having an automatic control system eliminating the need for manual operation. Other objects may be inferred from the following disclosure of a specific example of a machine embodying this invention.

Referring to the accompanying drawings:

FIG. 2 is a vertical section taken centrally through the machine as shown by FIG. 1;

FIG. 3 is a vertical section taken on the line 3—3 in FIG. 2;

FIG. 4 is an elevation view showing the wheel chucks which grasp the demounted wheels;

FIG. 5 is a vertical section taken on the line 5—5 in FIG. 4; and

Figure 1:
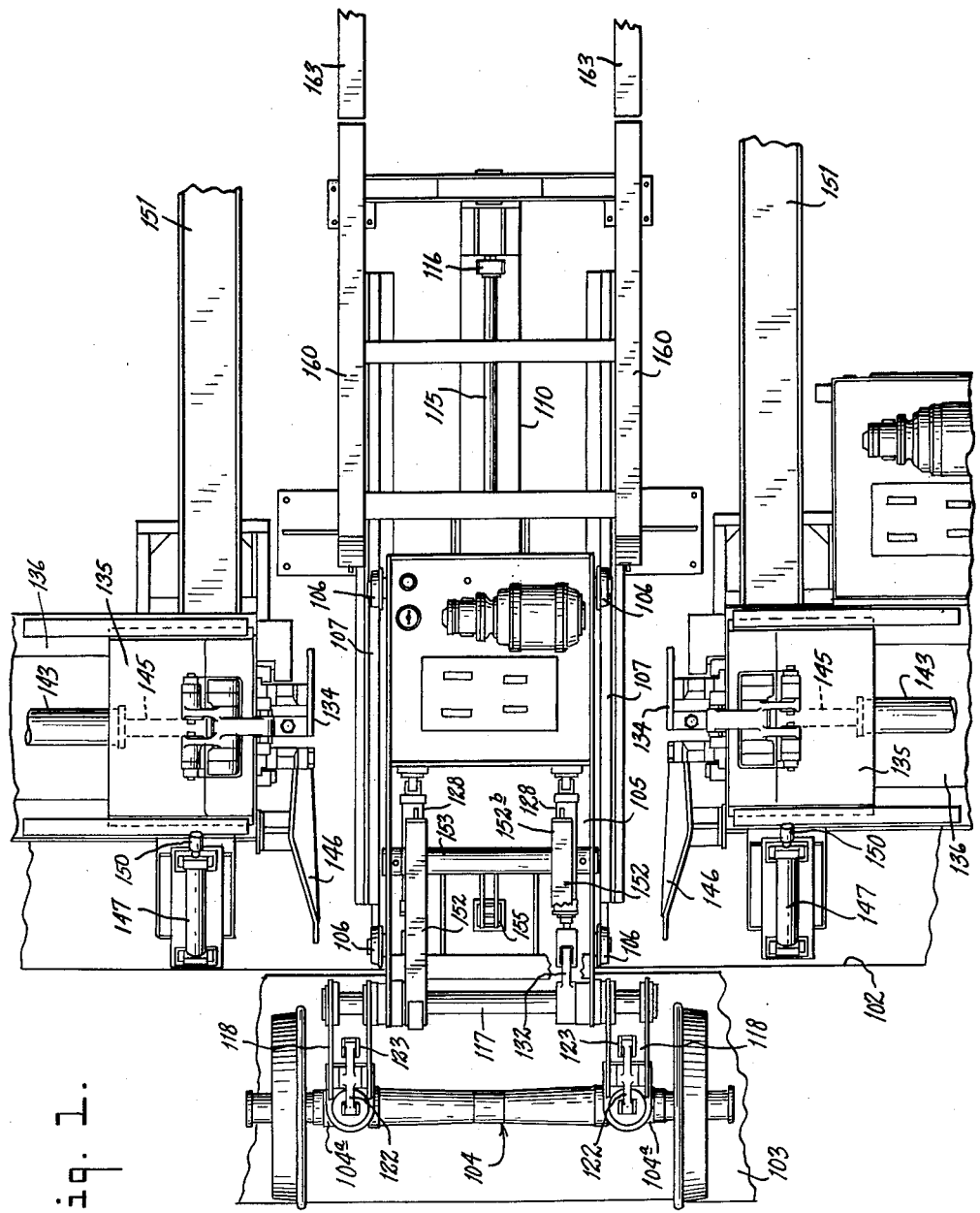
FIG. 1 is a top plan view of this specific example.

FIGS. 6 and 7 schematically show the automatic control system for the machine.

These drawings show the plant floor level 101 and the pit 102 in which operates a railroad wheel demounting press which is unillustrated excepting for its elevator 103 which at the end of the demounting cycle locates the loosened wheel and axle assembly 104 substantially flush with the floor level 101, prevented from rolling back and forth by chocks 103a. Although the demounting press is not illustrated otherwise than indicated it should be kept in mind that the press provides obstructions rising above the floor level 101 slightly beyond both ends of the wheel and axle set 104. Lateral removal is mandatory in the case of all known railroad wheel demounting presses.

The illustrated machine includes a truck 105 running on wheels 106 having flanges and riding rails 107 extending laterally with respect to the elevator 103 and the loosened wheel and axle set 104. The rear of this truck has a depending bracket 108 connecting the rear of the platform with wheels 109 running within channels 110 positioned beneath the floor level and parallel to the horizontal rails 107. This positively preventing the truck from tilting about its front wheels. When the truck is in its full advance position a hook 111 on the bracket 108 hooks beneath a solidly mounted cross bar 112 relieving the wheels 109 from stress at that time. The truck is moved horizontally back and forth over the rails 107 by means of a truck moving cylinder 113 connected to the truck 105 and containing a double-acting piston 114 having a standing connecting rod 115 which extends backwardly to an anchorage 116. Fluid introduced to the front of the cylinder 113 projects the truck forwardly and the truck is pulled back by the introduction of fluid to the rear end of the cylinder 113.

The forward end of the truck 105 mounts a transverse shaft 117 to which is connected a tilting axle chuck support 118. This support carries lower V-shaped chuck jaw 119 and an upper chuck jaw 120 arranged to vertically reciprocate while connected with the support 118. The axis of the shaft 117 is substantially in horizontal alignment with the axis of the wheel set 104 when the support 118 is tilted down as shown. The jaws 119 and 120 are interconnected to move concentrically with respect to the horizontal center line established as described. This is done by connecting the lower jaw 119 rigidly with a connecting rod 121, the upper arm of which connects with the upper end of the jaw 120 by way of a two-armed lever 122 having arms of equal length, and swinging links 123 and 124, the rocker arm being pivotally mounted at 125 rigidly to the upper portion of the support 118. The jaws are operated by a double-acting piston 126 mounted on the connecting rod 121 and surrounded by a hydraulic axle chucking cylinder 127 rigidly connected to the support 118. Fluid introduced into the lower end of the cylinder 127 closes the jaws and the latter are opened by fluid introduced into the upper end of this cylinder 127.

Incidentally, the truck mounts two of these supports 118 and the various parts described as being supported thereby, on both ends of the shaft 117, the parts being duplicates and being given similar numbers since they act in effect as one. The jaws 119 and 120 are interspaced so as to register with the wheel seats 104a of the axle of the assembly 104. That is because these wheel seats are exposed by the loosened wheels and provide surfaces machined concentric with the axis of the railroad axle.

Now it can be seen that by use of the truck moving cylinder 113 the truck 105, being horizontally retracted while the demounted press operated, can be pushed forward with the chuck jaws 119 and 120 open until they align with the axis of the railroad axle. Then by use of the axle chuck cylinders 127 the jaws 119 and 120 may be closed so as to grip the railroad axle with its axis laterally aligned parallel to and in a predetermined relationship to the axis of the shaft 117 journaled on the truck 105.

With the axle thus chucked the shaft 117 is rotated through a 90° arc by tilting cylinders 128 which at their rear ends have a pivotal connection 129 with the truck 105, each cylinder containing a double-acting piston 130 having a connecting rod 131 connecting with the swinging end of a lever 132 keyed to the shaft 117. Here again there are two arrangements which duplicate each other so as to apply a distributed torque to the shaft 117, the parts being identical, acting as one, and being given the same numerals therefor.

By use of the cylinders 128 the support 118 may be swung upwardly with the chucked axle swinging concentrically with respect to the axis of the shaft 117 until the axle's axis is vertically aligned with the axis of this shaft 117. Of course the wheels swing up with the axle because the latter's end flanges keep the wheels from falling off although they are wobbly on the axle.

Thus the wheel and axle assembly is plucked laterally out of the demounting press and held up in the air free from any interference so that by again using the truck cylinder 113 to pull the truck back, the wheel and axle assembly is removed bodily from the railroad wheel demounting press leaving the latter free to go back to work on a newly fed and still tight or fully mounted wheel and axle assembly.

The rearwardly moving truck 105 carries the wheel and axle assembly back to a wheel removing assembly which is, of course, part of the overall machine together with the truck and its parts.

This portion of the machine includes wheel chucks each comprising a lower set of interspaced chuck jaws 133 and an upper chuck jaw 134 with both mounted by a carriage 135 mounted to reciprocate transversely on a base 136 to traverse the path of travel of the wheels of the assembly carried backwardly by the truck 105. The jaws 133 and 134 vertically reciprocate on the carriage 135 equidistantly about a common horizontal center line by reason of being interconnected by links 137 and 138 through a two-armed lever 139 pivoted at 140 rockingly to the carriage 135 and having equal lengthed lever arms. The lower jaw 133 connects with a double-acting piston 141 in a wheel chuck cylinder 142. Fluid introduced to the bottom of the cylinder 142 closes the chuck and fluid sent to the top of the cylinder 142 opens the chuck.

Here again there are duplicate assemblies which work the same way on both sides, one for each of the wheels. Again similar numerals are applied to corresponding parts. The traversing action is effected by a wheel chuck traverse cylinder 143 containing a double-acting piston 144 connected to the carriage 135 by a connecting rod 145, there being one of these assemblies for each of the carriages. Fluid sent to the backs of the cylinders 143 moves the carriages together and fluid introduced to the fronts of these cylinders moves the carriages apart.

As the railroad wheels approach the jaws 133 and 134 of the wheel chucks they are wobbly on the railroad axle ends, so guides 146 are positioned in advance of the chucks for engagement by the wheels. These guides are contoured to straighten the wheels to a vertical position so that the rims of the wheels register with the chuck jaws so that closing of the latter as described provides for a proper wheel engagement.

The axle has its axis located in a predetermined manner by its relation with respect to the axis of the shaft 117 journaled by the truck 105 riding the rails 107. In turn the carriages 135 mount the chuck jaws so that when the latter are closed on the wheels by the action of the axle chuck cylinders 142, the axis of the two wheels is brought into registration or coincidence with the axle's axis. At this time the two carriages 135 are at their innermost positions where they receive the railroad wheels. Because the axes of the wheel and axle now coincide it is possible by operation of the wheel chuck traverse cylinders 143 to move the carriages apart carrying the wheels from the axle's ends with the axle flanges clearing the wheel hub bores since everything is concentric as required for such removal.

The wheels now being free from the axle the chuck jaws 133 and 134 may be opened and the wheels kicked laterally from these chucks by wheel ejecting cylinders 147. There are one of these cylinders for each of the chucks, each having a double-acting piston 148 provided with a connecting rod 149 terminating with a wheel ejecting bumper 150. These cylinders 148 are mounted by the bases 136 in each instance so as to register with the wheels in the chucks when the chuck carriages are separated after pulling off the wheels. The wheels can now roll down chutes 151 laterally away from the demounting press used to remove them from the axle wheel seats.

Going back to the truck 105, in addition to the equipment previously described, it also mounts an axle ejector 152 comprising laterally spaced arms pivoted on a shaft 153 mounted to the truck by way of an upright assembly 154. When this ejector is tilted downwardly it has an axle engaging surface 152a located below and a little in front of the axle clamped between the jaws 119 and 120 of the axle chuck and now, of course, up in the air directly above the axis of the shaft 117. Actuation of the cylinders 127 now can open the axle chucks so that the axles are deposited on these surfaces 152a. The ejector arms 152 can then be rocked upwardly by actuation of an axle ejector cylinder 155 pivoted at 156 to the truck 105 and extending upwardly. This cylinder contains a double-acting piston 157 having a connecting rod 158 pivoted at 159 to rock the ejector arms 152 upwardly. As this upward rocking occurs the now freed railroad axle rolls down the tops of the ejector arms 152. These arms have backward projections 152b which carry the rolling axle to upwardly positioned axle run-out rails 160 pivoted at 161 to stationarily upstanding supports 162. The other ends of these rails are always at a lower position for rolling run-out of the axle to stationary declining rails 163, but this rear end of the rails 160 may be lowered to reject axles unfit for refinishing.

With the front ends of the rails 160 pivoted at 161 their other or rear ends are pivotally connected at 164 to the connecting rod 165 extending upwardly from an axle reject cylinder 166, the latter containing a double-acting piston 167 connecting with the rod 165. When fluid is introduced to the bottom of this cylinder 166 the rails 160 are positioned to roll the axles to the run-out rails 163, but this cylinder 166 may be actuated to drop the rear ends of the rails 160 to a reject position rolling the axle to reject run-out rails 168.

Summarizing the foregoing it can be seen that the invention broadly provides a machine which includes the axle chuck means comprising the jaws 119 and 120 or their equivalent and the truck means comprising the truck 105 and its associated part, for moving the chuck means laterally with respect to the press where the demounted railroad wheel and axle assembly is located. This truck moves between forward and backward positions where the truck means engages the axle of the assembly and, at the backward position, locates it free from the press. The truck carries the means 118 and 128 and their interconnecting parts for raising the chuck means when engaging the axle of the assembly so as to lift it and its loose wheels and permit the truck means to move laterally from the press carrying the assembly therefrom to the truck's backward position.

As the truck approaches its backward position it, of course, approaches the wheel chuck means, provided by the jaws 133 and 134 and their actuating equipment, located to receive the wheels when the truck arrives at its backward position. These wheel chuck means have the jaw interlocking arrangement previously described so that they are provided with a means for moving them to center the wheels relative to the axle and to then move axially apart to remove the wheels over the axle's end flanges.

When the various chucks are released the rocking arms 152 provide a means for receiving the empty axle and conveying it laterally away from the machine to the tables 160 and 163 provided by the rails previously described. The wheel kicker or ejector 150 and the declining wheel chutes 151 provide a means for removing the wheels from the wheel chucks means and conveying these wheels laterally away from the machine. The axles can, of course, be sent to either of the tables 163 or 168 according to whether or not the axle is to be rejected as a possibility for refinishing.

Note that the machine picks the axle and loosening wheel assembly directly up from the demounting press and carries it laterally from the press and then continues to carry the separated axle and wheel laterally further from the press in the same travelling directions. Thus, the machine is ideally suited to be incorporated as part of an automated wheel and axle assembly processing line free from the need of manual manipulation.

Furthermore, an automatic system providing sequential operation of the various parts is provided as described below.

In the drawings illustrating this system the electrical wiring is not shown since it may be installed by any competent electrical engineer. Locations of the necessary limit switches are indicated in all instances, the mechanical and hydraulic elements of the machine being shown schematically and separated in the interests of clarifying the operation.

At the start of operations the motor 1 is operating and driving its hydraulic pump 2 and the motor 3 is operating and driving its hydraulic pump 4. The truck 105 is at its backward position and is operating limit switch, hereinafter abbreviated LS1. The axle chuck jaws 119 and 120 are opened against LS5A, the wheel chuck cylinders 127 are open against LS7A and LS7B, the wheel chuck traverse cylinders 143 are against LS8 and LS9 with the carriages 135 advanced towards each other, the axle ejector 152 is down against LS17, the wheel ejector cylinders 147 are back against LS14A and LS14B, and the axle rejector cylinder 166 is back against LS13 and held in place by the blocked ports of the valve 8B.

The machine is idling, pump 2 bypassing through valve 8A and pump 4 bypassing through valve 8B. Thus valve 8A is connecting its ports P to T with ports A to B blocked, and valve 8B is connecting its ports P to T with its ports A to B blocked.

As the wheel demounting press (not shown) completes its demounting operation its elevator 103 rises to floor level thus actuating LS6 and the truck 105 starts forward towards its forward position to contact LS2. Pump 2 is now delivering liquid to the truck cylinder 113 at its forward end and pump 4 is bypassing. Pump 2 is delivering through the pressure release valve 6A to the valve 9A which has shifted to connect its ports P to A and so to the front end of the cylinder 113. Valve 7B is a check valve and valve 8A has its port P connected to A and hence to the forward ends of the tilting cylinders 128. Valve 10A is shifted to connect its ports P to T and valve 5A is a spring loaded check valve. Valve 6B is a pressure relief valve.

When the truck moves to contact LS2 the valve 8B will port P to A if the axle rejector rails 160 drop.

As the axle chuck mount 118 tilts upwardly to its full up position it operates LS4, causing the truck to move out of the press carrying the axle and wheels and as soon as the axle clears the press LS6 is operated which is a single signal for the next operation of the demounting press which is, of course, not illustrated.

Pump 2 is now delivered to the truck cylinder 113 to continue the truck's backward travel, and to the tilting cylinders 128 and the axle chucking cylinders 127. Pump 4 is bypassing.

The relief valve 6A is in circuit with the pump 2, valve 9A is porting P to B and A to T, valve 11A is porting P to B, the check valve 7B is in circuit, valve 8A is porting P to B, valve 10A is porting P to T, the spring loaded check valve 5A is in circuit, valve 8B is porting P to T and the relief valve 6B is, of course, in circuit with the pump 4.

The truck continues to its backward position where it operates LS1 so as to cause the wheel chuck carriages 135 to move inwardly to pick up the wheels. The pump 2 is delivering to the truck cylinder 113, the tilting cylinders 128 and the axle chucking cylinders 127, while pump 4 is delivering to the wheel chuck carriage traversing cylinders 143.

The relief valve 6A opens as required with pressure build up, valve 9A is porting P to B and A to T, the valve 11A is porting P to B, the check valve 7B is in circuit, the valve 8A is porting P to B, valve 10A is porting P to T, the spring loaded check valve 5A is in circuit, valve 8B is porting P to T, valve 9B is porting P to B and the pressure relief valve 6B is in circuit.

When LS2 was operated by the truck arriving at the position where the chucks could pick up the axle from the press, the axle chucks must close so as to pick up and center the axle, pressure switch 1 then operating. At this time pump 2 is delivering to the truck cylinder, the tilting cylinders and the axle chucking cylinders, and pump 4 is bypassing. The relief valve 6A is in circuit, valve 9A is porting P to A, valve 11A is porting P to B, the pressure switch 1 is in circuit as is also the check valve 7B, valve 8A is porting P to A, valve 10A is porting P to T, spring loaded check valve 5A is in circuit, valve 8B is porting P to T and the relief valve 6B is in circuit.

As the pressure switch 1 operates the axle chucks tilt to their horizontal positions, raising the axle and wheels from the press elevator, by the tilting action of the wheel chuck mounts 118. At this time pump 2 is delivering to the truck cylinder, tilting cylinders and the axle chucking cylinders and pump 4 is bypassing. The relief valve 6A is in circuit, valve 9A is porting P to A, and check valve 7B is in circuit, valve 8A is porting P to B, valve 10A is porting P to T, spring loaded check valve 5A is in circuit and valve 8B is porting P to T.

As the wheel chuck carriages 135 move towards each other they operate LS10 and LS11 which are connected in series so the wheel chuck jaws close to lift and center the wheels relative to the axle, pressure switch 2 then being operated. Pump 2 continues to deliver to the truck, tilting and axle chucking cylinders and pump 4 now delivers to the wheel chuck cylinders 142 to close the wheel chuck jaws. To effect this phase the relief valve 6A remains in circuit, valve 9A ports P to B and ATT, valve 11A ports P to B, check valve 7B is in circuit, valve 8A ports P to B, valve 10A ports P to T, spring loaded check valve 5A is in circuit, valve 8B ports P to T, valve 9B ports P to B, valve 11B ports P to B to the wheel chuck cylinders, and the relief valve 6B is in circuit.

When the pressure switch 2 is operated by the wheel chucks closing upon the wheels and centering them, so as to build up the hydraulic pressure, this switch 2 causes the wheel chuck carriages to traverse outwardly carrying the wheels from the axle. At this time pump 2 continues to deliver to the truck, tilting and axle chucking cylinders while pump 4 continues to deliver to the wheel chuck cylinders 142 and now delivers to the wheel chuck carriage cylinders 143. At this stage the relief valve 6A is in circuit, valve 9A is porting P to B and A to T, valve 11A is porting P to B, check valve 7B is in circuit, valve 8A is porting P to B, valve 10A is porting P to T, the spring loaded check valve 5A is in circuit, valve 8B is porting P to T, valve 9B is porting P to A and B to T, valve 11B is porting P to B, and the relief valve 6B is in circuit.

When the wheel chuck carriages 135 move fully apart they operate LS8 and LS9 connected in series, the axle chucks open and drop the axle on the ejector arms 152, and the wheel chuck jaws open partially. Full opening would permit the wheels to fall forwardly in some instances. At this stage pump 2 delivers to the truck and tilting cylinders and reversely to the axle chucking cylinder, while pump 4 delivers to the wheel chucking cylinders and wheel chuck carriage traversing cylinders. At this time the relief valve 6A is in circuit, valve 9A is porting P to B, valve 11A is porting P to A, check valve 7B is in circuit, valve 8A is porting P to B, valve 10A is porting P to T, the spring loaded check valve 5A is in circuit, valve 8B is porting P to T, valve 9B is porting P to A, relief valve 6B is in circuit and valve 11B ports P to A to the wheel chuck cylinders.

As the axle chuck cylinders 127 move their pistons to chuck opening positions LS5A and LS5B, connected in series, operate and cause the axle transfer arms 152 to pick up the axle and roll it to the rail tables 163 or 168 as the case may be, LS15 being operated when the axle clears the machine. Then the wheel ejector cylinders 147 are powered so that the parts 150 kick the wheels from the wheel chucks, and as the wheels roll down the wheel chutes from the machine they trip LS16B. Now pump 2 delivers to the truck and tilting cylinders and to the cylinder 155 as required to lift the arms 152. Pump 4 is delivering now to the wheel chuck carriage cylinders 143 and to the cylinders 148 which operate the wheel ejectors. The relief valve 6A is in circuit, valve 9A is porting P to B, check valve 7B is in circuit, valve 9A is porting P to B, valve 10A is porting P to B to the axle ejecting cylinder operating 152, spring loaded check valve 5A is in circuit, valve 8B is porting P to A, valve 9B is porting P to A, valve 10B is porting P to B to the wheel ejecting cylinders 147, valve 11B is porting P to T with A and B blocked, and the relief valve 6B is in circuit.

As the axle leaves the machine it trips LS15 and the axle ejecting cylinder 155 permits the arms 152 to drop and operate LS3. The wheels leaving the machine trip LS16A and LS16B, and as the wheel ejecting cylinders return they trip LS14A and 14B, the wheel chucks opening to operate LS7A and LS7B.

Now pump 2 delivers to the truck cylinder and tilting cylinders and pump 4 delivers to the wheel chuck carriage cylinders 143 and the wheel chuck cylinders 141. The relief valve 6A is in circuit, valve 9A is porting P to B, check valve 7B is in circuit, valve 8A ports P to A to the tilting cylinders 128, valve 10A ports P to A, the spring loaded check valve 5A is in circuit, valve 8B ports P to A, valve 9B ports P to A, valve 10B ports P to A, valve 11B ports P to A and the relief valve 6B is in circuit.

When LS15 is tripped by the axle leaving the machine the axle ejecting cylinder 155 returns to operate LS17 and the chuck mount tilting cylinders 128 return to operate LS3. The wheels leaving the machine trip LS16A and 16B and the ejector cylinders 147 return the parts 150 to actuate LS14A and LS14B. The wheel chucks open to operate LS7A and LS7B. Now the pump 2 delivers to the truck cylinder 113 and tilting cylinders 127. Pump 4 delivers to the wheel chuck carriage cylinders 143 and the wheel chuck cylinders 142. Relief valve 6A is in circuit, valve 9A ports P to B, valve 7B is in circuit, valve 8A ports P to A to the tilting cylinders, valve 10A ports P to A, the spring loaded check valve 5A is in circuit, valve 8B ports P to A, valve 9B ports P to A, valves 10B and 11B both port P to A and the relief valve 6B is in circuit.

Limit switch 3 is now contacted and the cycle ends. Both pumps are bypassing and all the valves are in duplicate. LS15 is operated and pump 2 delivers to valve 10A which is porting P to A to return the axle ejecting cylinders 147 and valve 8A is porting P to A to return the tilting cylinders. Pump 4 now delivers to the valve 10B which is porting P to A to return the wheel ejector cylinder and valves 11B and 11C porting P to A to return the wheel chuck cylinders. This is when limit switch 3 is contacted to terminate the cycle.

We claim:

1. A machine for removing wheels from a demounted railroad wheel and axle assembly comprising an axle and a wheel loosely mounted on each end portion inward of the end flange and including wheel chuck means having opposed jaws adapted to receive and clamp an upright railroad wheel's rim and means for reciprocating said jaws equidistantly with respect to a predetermined center line extending horizontally and axially with respect to the rim when clamped by said jaws, means for picking up said assembly by its axle and positioning the latter horizontally at a location where said axle is coaxially aligned with said center line and the rim of one of its loosened wheels is located between said jaws, whereby reciprocation of said jaws towards said center line moves said wheel by its rim to coaxial relation with said axle and clamps said wheel by its rim, and means for reciprocating said wheel chuck means axially with respect to said axle positioned at said location by said picking up means while said jaws clamp said rim coaxially with respect to said axle so that the wheel's bore clears the axle's end flange.

2. A machine for removing wheels from a demounted railroad wheel and axle assembly comprising an axle and a wheel loosely mounted on each end portion inward of the end flange and including wheel chuck means having opposed jaws adapted to receive and clamp an upright railroad wheel's rim and means for reciprocating said jaws equidistantly with respect to a predetermined center line extending horizontally and axially with respect to the rim when clamped by said jaws, means for picking up said assembly by its axle and positioning the latter horizontally at a location where said axle is coaxially aligned with said center line and the rim of one of its loosened wheels is located between said jaws, whereby reciprocation of said jaws towards said center line moves said wheel by its rim to coaxial relation with said axle and clamps said wheel by its rim, and means for reciprocating said wheel chuck means axially with respect to said axle positioned at said location by said picking up means while said jaws clamp said rim coaxially with respect to said axle so that the wheel's bore clears the axle's end flange; said picking up means including axle chucks having opposed jaws adapted to transversely receive and clamp said axle and means for reciprocating said axle chucks transversely from a retracted location positioning said axle at the first-named location to an advanced location remote from the first-named location where said axle chuck jaws may transversely receive the horizontal axle of said assembly when at said advanced location.

3. A machine for removing wheels from a demounted railroad wheel and axle assembly comprising an axle and a wheel loosely mounted on each end portion inward of the end flange and including wheel chuck means having opposed jaws adapted to receive and clamp an upright railroad wheel's rim and means for reciprocating said jaws equidistantly with respect to a predetermined center line extending horizontally and axially with respect to the rim when clamped by said jaws, means for picking up said assembly by its axle and positioning the latter horizontally at a location where said axle is coaxially aligned with said center line and the rim of one of its loosened wheels is located between said jaws, whereby reciprocation of said jaws towards said center line moves said wheel by its rim to coaxial relation with said axle and clamps said wheel by its rim, and means for reciprocating said wheel chuck means axially with respect to said axle positioned at said location by said picking up means while said jaws clamp said rim coaxially with respect to said axle so that the wheel's bore clears the axle's end flange; said picking up means including axle chucks having opposed jaws adapted to transversely receive and clamp said axle and means for reciprocating said axle chucks transversely from a retracted location positioning said axle at the first-named location to an advanced location remote from the first-named location where said axle chuck jaws may transversely receive the horizontal axle of said assembly when at said advanced location; and means for guiding said loosened wheel as said axle chucks are moved toward their first-named location to cause said wheel's rim to align with said wheel chuck means jaws for engagement thereby.

4. A machine for removing wheels from a demounted railroad wheel and axle assembly comprising an axle and a wheel loosely mounted on each end portion inward of the end flange and including wheel chuck means having opposed jaws adapted to receive and clamp an upright railroad wheel's rim and means for reciprocating said jaws equidistantly with respect to a predetermined center line extending horizontally and axially with respect to the rim when clamped by said jaws, means for picking up said assembly by its axle and positioning the latter horizontally at a location where said axle is coaxially aligned with said center line and the rim of one of its loosened wheels is located between said jaws, whereby reciprocation of said jaws towards said center line moves said wheel by its rim to coaxial relation with said axle and clamps said wheel by its rim, and means for reciprocating said wheel chuck means axially with respect to said axle positioned at said location by said picking up means while said jaws clamp said rim coaxially with respect to said axle so that the wheel's bore clears the axle's end flange; said picking up means including axle chucks having opposed jaws adapted to transversely receive and clamp said axle and means for reciprocating said axle chucks transversely from a retracted location positioning said axle at the first-named location to an advanced location remote from the first-named location where said axle chuck jaws may transversely receive the horizontal axle of said assembly when at said advanced location; said axle chuck reciprocating means including means for rotating said axle chuck jaws about a horizontal axis from a position where they transversely receive said axle in a horizontal plane when at said advanced location and transversely release said axle in a generally vertical plane when at said first-named location, axle conveying means extending from said first-named location in a direction away from said advanced location, and means for transferring the axle from said axle chuck jaws upwardly and to said conveying means when the axle chuck jaws are unclamped.

5. A machine for removing wheels from a demounted railroad wheel and axle assembly comprising an axle and a wheel loosely mounted on each end portion inward of the end flange and including wheel chuck means having opposed jaws adapted to receive and clamp an upright railroad wheel's rim and means for reciprocating said jaws equidistantly with respect to a predetermined center line extending horizontally and axially with respect to the rim when clamped by said jaws, means for picking up said assembly by its axle and positioning the latter horizontally at a location where said axle is coaxially aligned with said center line and the rim of one of its loosened wheels is located between said jaws, whereby reciprocation of said jaws towards said center line moves said wheel by its rim to coaxial relation with said axle and clamps said wheel by its rim, and means for reciprocating said wheel chuck means axially with respect to said axle positioned at said location by said picking up means while said jaws clamp said rim coaxially with respect to said axle so that the wheel's bore clears the axle's end flange; said picking up means including axle chucks having opposed jaws adapted to transversely receive and clamp said axle and means for reciprocating said axle chucks transversely from a retracted location positioning said axle at the first-named location to an advanced location remote from the first-named location where said axle chuck jaws may transversely receive the horizontal axle of said assembly when at said advanced location; said axle chuck reciprocating means including means for rotating said axle chuck jaws about a horizontal axis from a position where they transversely receive said axle in a horizontal plane when at said advanced location and transversely release said axle in a generally vertical plane when at said first-named location, axle conveying means extending from said first-named location in a direction away from said advanced location, and means for transferring the axle from said axle chuck jaws upwardly and to said conveying means when the axle chuck jaws are unclamped; and wheel conveying means extending from said wheel chuck means jaws in a direction away from said advanced location and means for transferring the wheel from said wheel chuck means jaws to said wheel conveying means.

6. A machine for removing wheels from a demounted railroad wheel and axle assembly comprising an axle and a wheel loosely mounted on each end portion inward of the end flange and including wheel chuck means having opposed jaws adapted to receive and clamp an upright railroad wheel's rim and means for reciprocating said jaws equidistantly with respect to a predetermined center line extending horizontally and axially with respect to the rim when clamped by said jaws, means for picking up said assembly by its axle and positioning the latter horizontally at a location where said axle is coaxially aligned with said center line and the rim of one of its loosened wheels is located between said jaws, whereby reciprocation of said jaws towards said center line moves said wheel by its rim to coaxial relation with said axle and clamps said wheel by its rim, and means for reciprocating said wheel chuck means axially with respect to said axle positioned at said location by said picking up means while said jaws clamp said rim coaxially with respect to said axle so that the wheel's bore clears the axle's end flange; said picking up means including axle chucks having opposed jaws adapted to transversely receive and clamp said axle and means for reciprocating said axle chucks transversely from a retracted location positioning said axle at the first-named location to an advanced location remote from the first-named location where said axle chuck jaws may transversely receive the horizontal axle of said assembly when at said advanced location; and means automatically responsive to the presence of said assembly at said advanced location for causing said axle chuck reciprocating means to move said axle chucks to said advanced location and clamp the axle chucks jaws on the axle and return to the first-named location, and means automatically responsive to the arrival of said axle chucks at said first-named location for causing said wheel chuck reciprocating means to reciprocate inwardly and outwardly, and means responsive to the arrival of said wheel chuck means at its inward position for causing said wheel rim jaws to clamp in the assembly's wheel and to remain clamped while the wheel chuck means moves outwardly to remove the wheel.

References Cited in the file of this patent

UNITED STATES PATENTS

| | | |
|---|---|---|
| 1,196,963 | Mahr | Sept. 5, 1916 |
| 2,508,698 | Von Beren | May 23, 1950 |
| 2,634,036 | Griswold | Apr. 7, 1953 |
| 2,699,697 | Kelso | Jan. 18, 1955 |
| 2,934,819 | Sorensen | May 3, 1960 |